Sept. 6, 1927. 1,641,760
C. B. HULL
BRAKE FOR AIRPLANES
Filed May 13, 1926
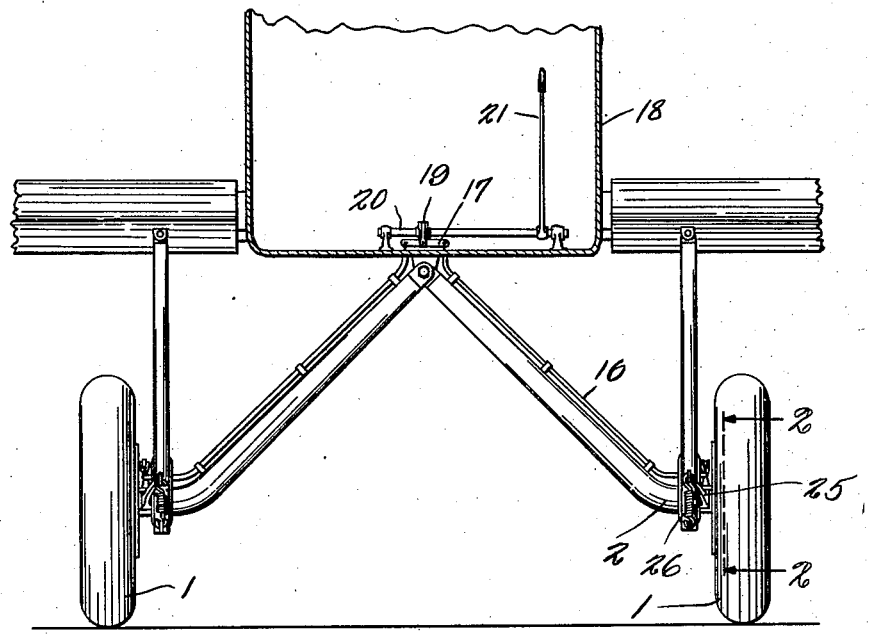
Fig. 1
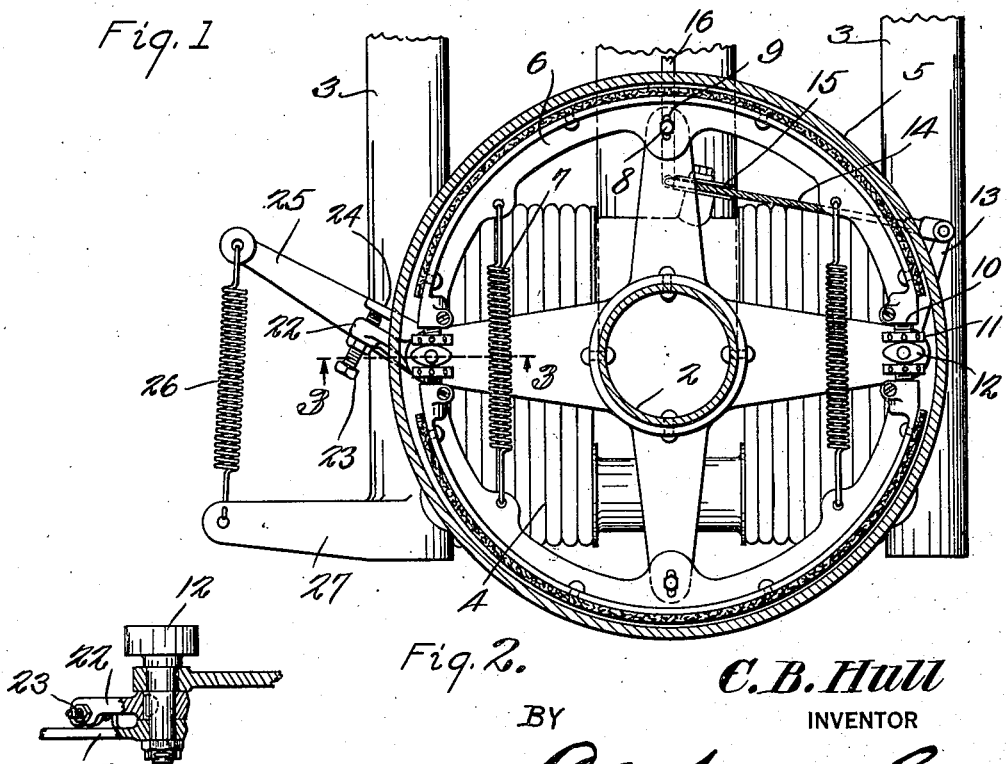
Fig. 2
Fig. 3
C. B. Hull
INVENTOR
BY C. A. Snow & Co.
ATTORNEYS.

Patented Sept. 6, 1927.

1,641,760

UNITED STATES PATENT OFFICE.

CLOICE B. HULL, OF CLEVELAND, OHIO.

BRAKE FOR AIRPLANES.

Application filed May 13, 1926. Serial No. 108,897.

This invention relates to a brake for use in connection with the wheels of airplanes whereby, during the landing of the airplane, the rotation of the wheels of the running gears can be retarded either automatically or at the will of the pilot.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a front elevation of a portion of an airplane having the present improvements combined therewith, a portion of the cockpit being shown in section.

Figure 2 is a section on line 2—2, Figure 1, said section being on an enlarged scale.

Figure 3 is a section on line 3—3, Figure 2.

Referring to the figures by characters of reference 1 designates wheels of the running gear, the axle structure 2 being mounted for up and down movement between struts 3 which are fixed relative to the plane, rubber cords 4 being used as ordinarily for absorbing the shock resulting from landing. In other words during the usual ordinary landing operation the planes and fuselage of the airplane move downwardly relative to the supporting wheels and cause the rubber cords 4 to stretch and thus absorb the shock.

The apparatus constituting the present invention has for an object the utilization of this relative movement for the purpose of arresting the rotation of the wheels 1. Secured to each wheel is a drum 5 adapted to rotate therewith and, in the structure illustrated in Figure 2, opposed arcuate brake shoes 6 are movably mounted within the drum and are held normally drawn toward each other by springs 7. These shoes may be guided in any suitable manner, as by means of studs 8 projecting through slots 9 in the central portions of the shoes. Screws 10 are mounted in the ends of each shoe and have heads 11 for engagement with spreading cams 12. By rotating these screws they can be adjusted relative to the cams so as to adjust the shoes for proper operation within the drum. One of the cams in each drum 5 rotates with an arm 13 located outside of the drum and having a cord 14 attached thereto. This cord is extended into engagement with a guide sheave 15 and thence through a guide tube 16 to a cross head 17 located in the cockpit 18 of the airplane. A link 19 is secured to the center of the cross head and is fastened to a shaft 20 adapted to be rotated by means of a lever 21. Thus it will be seen that when this lever is pulled backwardly the arm 13 associated with each of the drums 5 will be pulled by the cord 14 so that one cam 12 of each pair will be rotated to expand the brake and cause the shoes 6 to engage the drum 5 and thus arrest the rotation of the drum and the wheel to which it is attached. By moving the lever 21 forwardly the cams 12 will be released and the springs 7 will pull the brake shoes out of contact with the drum, thereby allowing the wheels to rotate freely.

The other cam 12 in each drum rotates with an arm 22 having a screw 23 extending therethrough and bearing normally against an ear 24 extending laterally from another arm 25. This arm 25 rotates freely about the axis of the cam 12 and is connected by a spring 26 to an arm 27 extending from one of the struts 3. Normally the two cams 12 in the drum are positioned as shown in Figure 2 and the brake shoes are out of contact with the drum. During the landing operation, however, the fuselage and planes of the machine will move downwardly relative to the wheel supported axle with the result that the struts 3 will also move downwardly. Consequently the arms 27 will pull through the springs 26 on the arms 25 and cause motion to be transmitted through ears and screw 23 to the arms 22. This will result in the rotation of the cam 12 connected to the arms 22. Consequently the brake shoes 6 will be spread apart so as to contact with the drum 5 and thus arrest the motion of the airplane along the ground.

From the foregoing it will be apparent that the forward movement of the airplane, while in contact with the ground, can be controlled both automatically as a result of the relative movement of the fuselage and supporting wheel and at the will of the operator through the actuation of the lever 21. By providing the lever 21 and the parts controlled thereby a further advantage results inasmuch as the wheels can be held while the engine is being warmed up and when it is desired to take off the pilot merely moves the lever 21 forward so as to release the brake drums and allow the wheels to revolve.

It might be stated that when landing it is necessary for the operator first to pull the lever 21 backwardly so as to expand or spread apart the brake shoes at one end so that during the landing operation the other ends of the brake shoes will also be spread apart under the relative movement of the fuselage and supporting wheels.

What is claimed is:

1. The combination with an airplane structure including supporting wheels mounted for bodily movement relative to plane during the landing operation, of normally inactive wheel arresting means, means operated by the relative movement of the plane and wheels while landing for operating the wheel arresting means to partly apply the same, and means under the control of the pilot for completing the application of the wheel arresting means to stop the rotation of the wheels after landing.

2. In an airplane structure the combination with supporting wheels and brake drums rotatable therewith, of brake shoes for cooperation with the drum, yielding means for holding the shoes normally disengaged from the drum, means under the control of the pilot for shifting the shoes relative to the drums, and means operated by the weight of the airplane during the landing operation for completing the shifting of the shoes to apply them to the drums and arrest the rotation of the wheels.

3. The combination with an airplane structure including relatively fixed struts, supporting wheels, an axle structure mounted for up and down movement relative to the struts, and cushioning means for retarding the relative movement of the axle structure and struts, of a brake drum rotatable with each wheel, opposed arcuate shoes movably mounted within each drum, yielding means for holding the shoes normally drawn toward each other and out of contact with the drum, spreading means between the ends of the shoes, means operated by the relative movement of the struts and wheels for actuating one of the spreading means to shifting the shoes at one end to frictionally engage the drum, and means under the control of the pilot for actuating the other spreading means to shift the adjacent ends of the shoes into contact with the drum.

4. The combination with an airplane structure and a landing gear therefor including supporting wheels, said structure being movable downwardly relative to the wheels under the weight of the structure when the wheels are in contact with the ground, of a brake drum rotatable with each wheel, opposed arcuate shoes assembled with each drum, yielding means for holding the shoes normally out of contact with the drum, separate spreading elements between the ends of the shoes, means actuated by the downward movement of the airplane structure relative to the wheels for actuating one of the spreading elements to shift the shoes at one end into frictional engagement with the drum, and means under the control of the pilot for actuating the other spreading element to shift the shoes at their other end into frictional engagement with the drum.

5. The combination with an airplane structure and a landing gear therefor including supporting wheels, said structure being movable downwardly relative to the wheels under the weight of the structure when the wheels are in contact with the ground, of a brake drum rotatable with each wheel, opposed arcuate shoes assembled with each drum, yielding means for holding the shoes normally out of contact with the drum, separate spreading elements between the ends of the shoes, means actuated by the downward movement of the airplane structure relative to the wheels for actuating one of the spreading elements to shift the shoes at one end into frictional engagement with the drum, means under the control of the pilot for actuating the other spreading element to shift the shoes at their other end into frictional engagement with the drum, and adjustable means carried by the ends of the shoes for engagement by the spreading means for advancing or retarding the actuation of the shoes by the spreading means.

6. The combination with an airplane structure and a landing gear therefor including supporting wheels, said structure being movable downwardly relative to the wheels under the weight of the structure when the wheels are in contact with the ground, of a brake drum rotatable with each wheel, opposed arcuate shoes assembled with each drum, yielding means for holding the shoes normally out of contact with the drum, separate elements adjacent the ends of the shoes, means actuated by the downward movement of the airplane structure relative to the wheels for actuating one of said elements to shift the shoes at one end into frictional engagement with the drum, and means under the control of the pilot for actuating the other element to shift the shoes at their other end into frictional engagement with the drum.

7. The combination with an airplane structure and a landing gear therefor including supporting wheels, said structure being movable downwardly relative to the wheels under the weight of the structure when the wheels are in contact with the ground, of a brake drum rotatable with each wheel, opposed arcuate shoes assembled with each drum, yielding means for holding the shoes normally out of contact with the drum, separate elements between the ends of the shoes, means actuated by the downward movement of the airplane structure relative to the wheels for actuating one of said elements to shift the shoes at one end into frictional engagement with the drum, means under the control of the pilot for actuating the other element to shift the shoes at their other end into frictional engagement with the drum, and adjustable means carried by the ends of the shoes for engagement by said elements for advancing or retarding the actuation of the shoes by said elements.

In testimony that I claim the foregoing as my own, I have hereto affixed my signature.

CLOICE B. HULL.